United States Patent
Ishihara et al.

(10) Patent No.: US 6,708,246 B1
(45) Date of Patent: Mar. 16, 2004

(54) SIGNAL PROCESSING DEVICE WITH BUS OWNERSHIP CONTROL FUNCTION

(75) Inventors: Kazuya Ishihara, Hyogo (JP); Hiroshi Segawa, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 512 days.

(21) Appl. No.: 09/692,041

(22) Filed: Oct. 20, 2000

(30) Foreign Application Priority Data

Dec. 27, 1999 (JP) .......................................... 11-369924

(51) Int. Cl.$^7$ ............................................... G06F 1/00
(52) U.S. Cl. ....................... 710/309; 710/107; 710/110; 710/308; 710/306; 710/315
(58) Field of Search ................................ 710/300–305, 710/107–108, 110, 119, 309, 308, 200, 242, 262, 267; 709/201–202, 208, 210, 234

(56) References Cited

U.S. PATENT DOCUMENTS

| | | | |
|---|---|---|---|
| 5,142,683 A | * 8/1992 | Burkhardt, Jr. et al. | 710/260 |
| 5,625,829 A | * 4/1997 | Gephardt et al. | 710/302 |
| 5,968,153 A | * 10/1999 | Wheeler et al. | 710/110 |
| 6,105,094 A | * 8/2000 | Lindeman | 710/107 |
| 6,163,829 A | * 12/2000 | Greim et al. | 710/260 |
| 6,195,721 B1 | * 2/2001 | Rice | 710/309 |
| 6,415,345 B1 | * 7/2002 | Wu et al. | 710/309 |
| 6,434,638 B1 | * 8/2002 | Deshpande | 710/39 |
| 6,496,890 B1 | * 12/2002 | Azevedo et al. | 710/110 |
| 6,532,507 B1 | * 3/2003 | Falik et al. | 710/107 |

FOREIGN PATENT DOCUMENTS

JP    5-20412    1/1993

OTHER PUBLICATIONS

"A Single–Chip MPEG2 422@ML Video, Audio and System Encoder with a 162–MHz Media–Processor and Dual Motion Estimation Cores" by Kawamoto et al., Technical Report of IEICE, ED99–60, SMD99–34, ICD99–42 (Jun. 1999), pp. 39–44.

* cited by examiner

*Primary Examiner*—Paul R. Myers
*Assistant Examiner*—Raymond N Phan
(74) *Attorney, Agent, or Firm*—McDermott, Will & Emery

(57) ABSTRACT

A signal processing device includes an integrated processor, a video processing unit coding a video signal, and an interface controlling a bus ownership between the integrated processor and an external processor. The interface detects the integrated processor accessing an external device and asserts a bus request. Thus the signal processing device can process data with a shorter cycle and thus more efficiently.

14 Claims, 5 Drawing Sheets

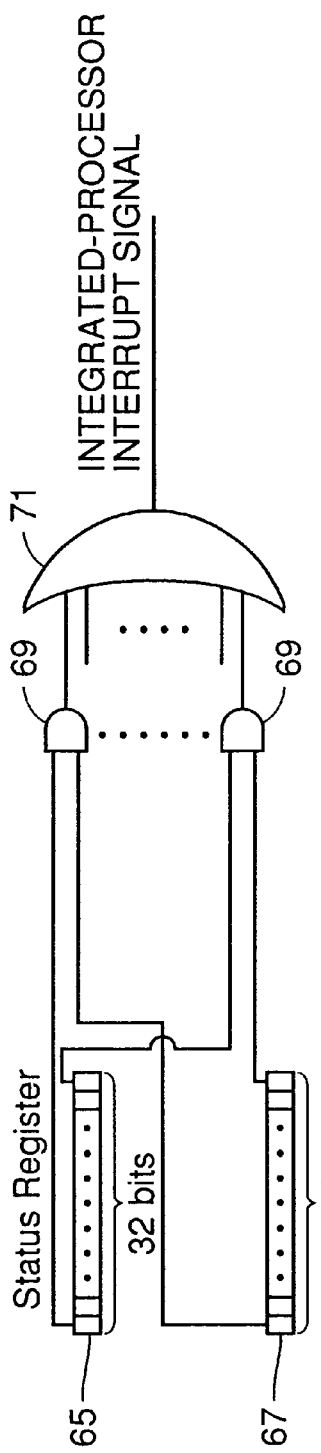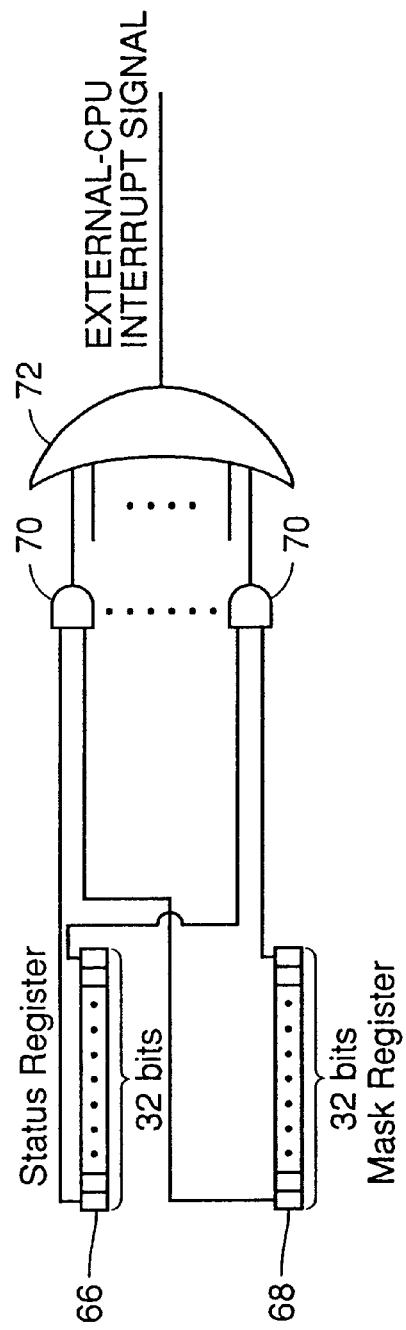
FIG.5A
FIG.5B

SIGNAL PROCESSING DEVICE WITH BUS OWNERSHIP CONTROL FUNCTION

BACKGROUND OF THE INVENTION

1. Field of the Invention

The present invention relates generally to techniques for coding motion images and the like and particularly to devices coding data more efficiently.

2. Description of the Background Art

In recent years multimedia technology has been increasingly studied in various fields and particularly important are techniques for coding image signals having enormous amounts of data. In transmitting and storing such image data, it is essential to use a data compression technique to reduce the amount of the data.

In general, image data has redundancy of a significant level attributed to a correlation between adjacent pixels, a human visual characteristic, and the like. A data compression technique used to suppress such a redundancy of image data and hence to reduce an amount of data to be transmitted is referred to as high-efficiency coding. In the high-efficiency coding, efficiently reducing data entails an adaptive processing.

The adaptive processing requires another, software-controllable processor, which can be related to a technique "Development of media-processor incorporated 1-chip MPEG2 422@ML Video, Audio, System Encoder," Technical Report of IEICE, ED99-60, SMD99-34, ICD99-42. This document describes that a coding, large scale integrated circuit (LSI) including an incorporated processor depending on the process(es) as required and an external, central processing unit (CPU) are used and that the Coding LSI and the external CPU require an interface therebetween.

If an integrated processor and an external CPU share a bus, the ownership of the bus is transferred therebetween. For example, when the bus slave (the integrated processor) issues a bus request (BUSR) to the bus master (the external processor) and the bus master can release the bus, the bus master issues a bus acknowledgement (BUSA) and the ownership of the bus is thus transferred. As such, if the bus ownership is frequently transferred between the integrated processor and the external CPU, the coding LSI's processing efficiency will be disadvantageously reduced.

Furthermore, conventionally an interrupt factor for the integrated processor and that for the external CPU are allotted to a single status register, resulting in a cumbersome interrupt processing in the coding device.

SUMMARY OF THE INVENTION

The present invention contemplates a signal processing device capable of processing data with a reduced cycle and thus more efficiently.

The present invention also contemplates a signal processing device capable of reducing an interrupt processing load to process data more efficiently.

In one aspect of the present invention, the signal processing device includes an integrated processor, and an interface controlling a bus ownership between the integrated processor and an external processor, wherein the interface includes a first detect portion detecting an access of the integrated processor to an external device, a second detect portion detecting a write to a predetermined register, and a bus control portion asserting a bus request to the external processor in response to a result of detection provided by the first detect portion, and negating a bus request to the external processor in response to a result of detection provided by the second detect portion.

With the bus control portion thus configured, if the signal processing device accesses the external device successively, the ownership of the bus is only transferred once. As such, the device can process data more efficiently.

In another aspect of the present invention, the signal processing device includes an integrated processor, and an interface controlling a bus ownership between the integrated processor and an external processor, wherein the interface includes a first status register allotted an interrupt factor for the integrated processor and a second status register distinguished from the first status register and allotted an interrupt factor for the external processor.

Since the first and second status registers may be provided separately, the integrated processor is not interrupted due to an interrupt factor for the external processor. Thus the signal processing device can process data more efficiently.

Preferably, the signal processing device further includes a video processing unit connected to the integrated processor via an internal bus to code a video signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A and 5B are a block diagram showing an internal configuration of a register block according to a second embodiment of the present invention.

DESCRIPTION OF THE PREFERRED EMBODIMENTS

First Embodiment

Figure 1:
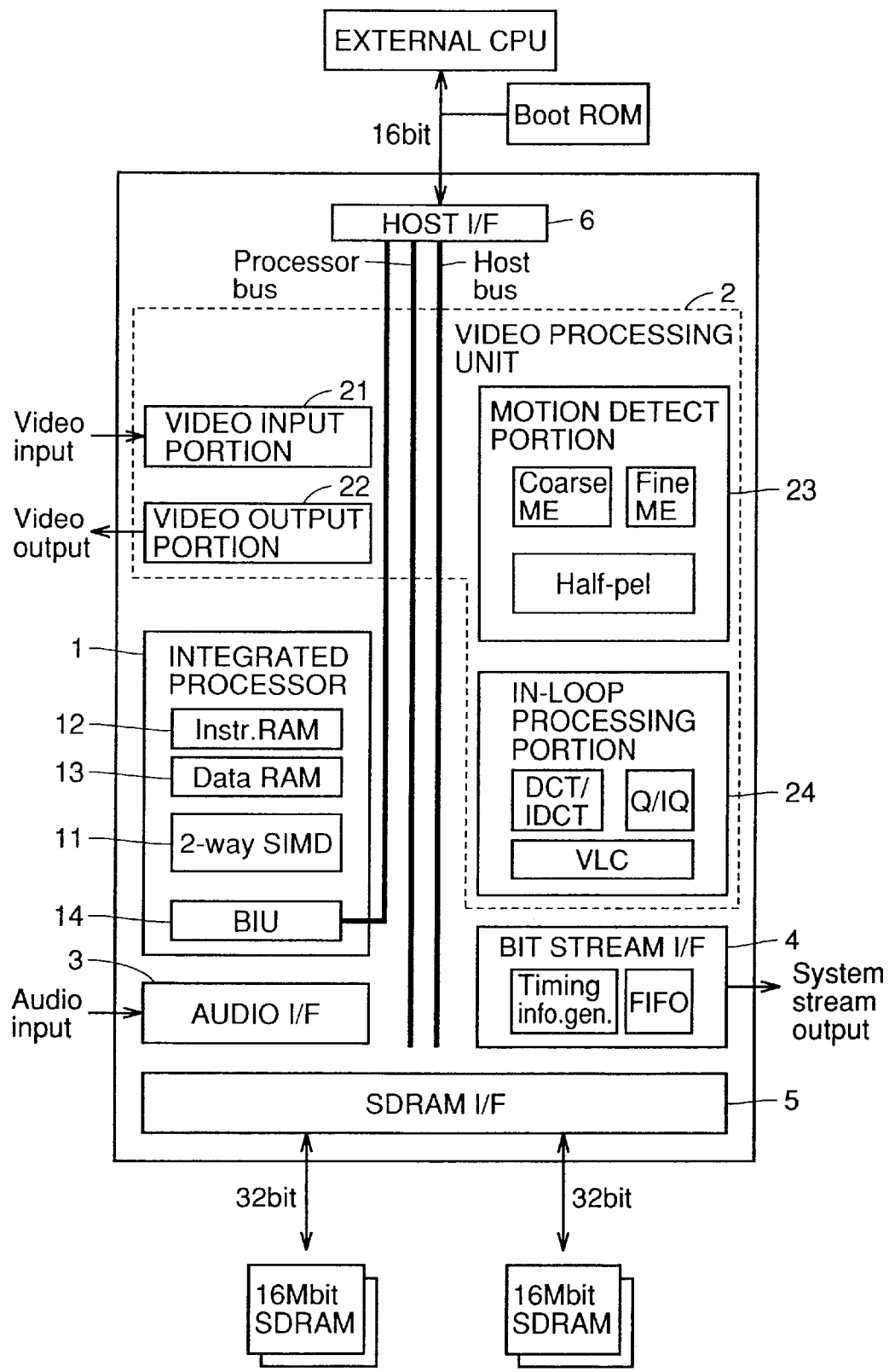
FIG. 1 is a block diagram showing a schematic configuration of a coding device according to a first embodiment of the present invention.

FIG. 1 is a block diagram showing a schematic configuration of a coding device according to a first embodiment of the present invention. The coding device includes an integrated processor 1, a video processing unit 2 receiving and processing a video signal, an audio I/F (interface) 3 receiving and processing a PCM (pulse code modulation) signal, a bit-stream I/F 4, an SDRAM (synchronous dynamic random access memory) I/F 5, and a host I/F 6 connected to an external CPU.

Integrated processor 1 includes a media processor 11 of a 2-way VLIW (very long instruction word) type having a 2-way SIMD (single instruction stream-multiple data stream) data bus, an instruction memory 12, a data memory 13, and a bus I/F unit 14. Integrated processor 1 can access the memories, registers and the like in the coding device via bus I/F unit 14.

Video processing unit 2 includes a video input portion 21 receiving a video signal, a video output portion 22 outputting a video signal, a motion detect portion detecting a motion of a subject in a motion image, and an in-loop processing portion 24 providing discrete cosine transformation and inverse discrete cosine transformation. Bit stream I/F 4 is responsible for the management of outputting video stream data, audio stream data and the system stream data.

Figure 2:
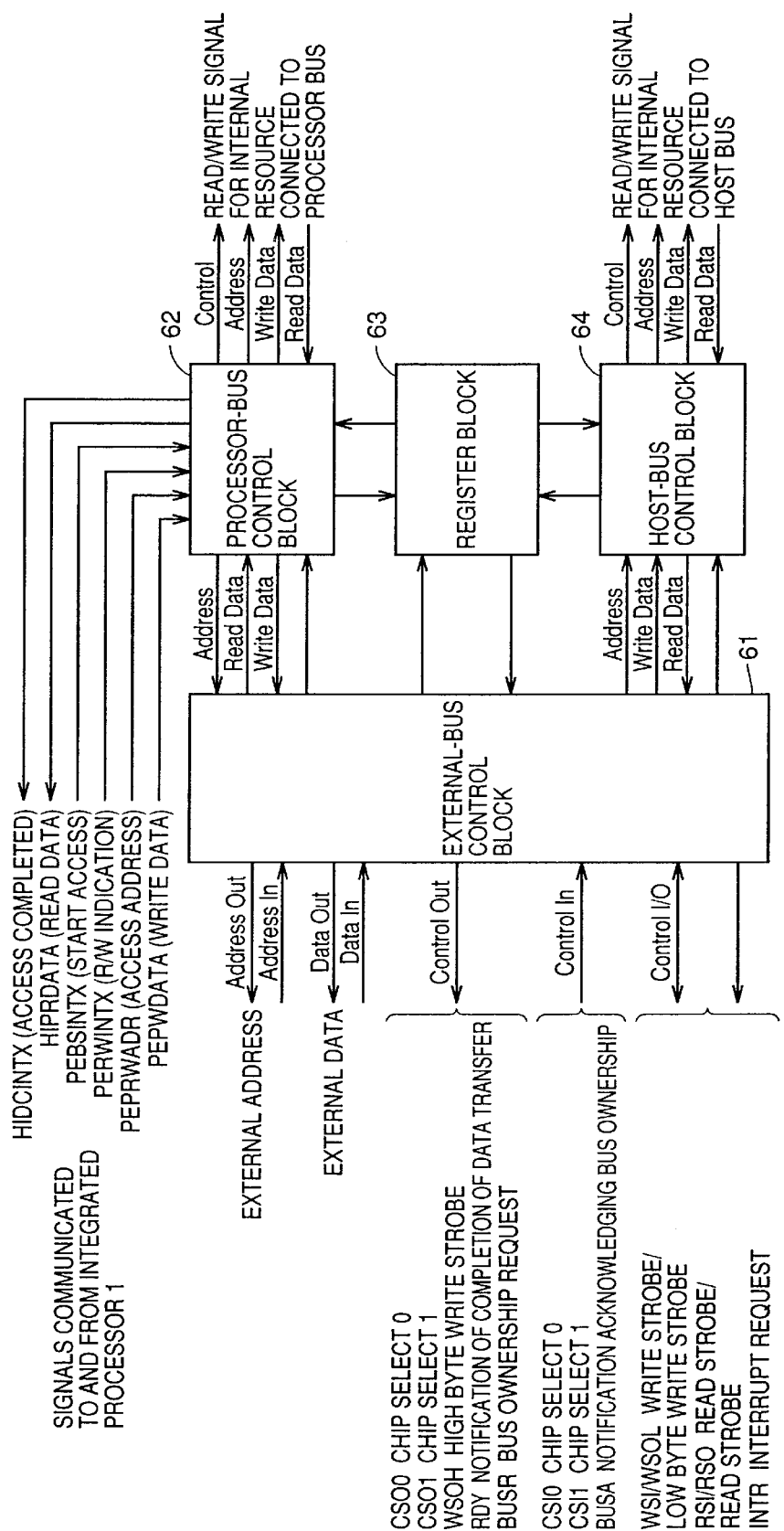
FIG. 2 is a block diagram specifically showing a host I/F 6 of the coding device according to the first embodiment of the present invention.

FIG. 2 is a block diagram specifically showing host I/F 6 of the coding device of the present embodiment. Host I/F 6 includes an external-bus control block 61 connected to a bus external to the coding device to e.g., communicate data with the external CPU via the external bus, a processor-bus control block 62 connected to a processor bus internal to the coding device to control data communication between external-bus control block 61 and the processor bus, a register block 63 having registers described hereinafter, and a host-bus control block 64 connected to a host bus internal to the coding device to control data communication between external-bus control block 61 and the host bus.

External-bus control block 61 and the external bus communicate therebetween the signals as described below:

Signals Address Out and Address In are address signals connected to the external bus. Signals Data Out and Data In are data signals connected to the external bus.

A signal Control Out is a control signal output in e.g., writing data for example to a static random access memory (SRAM) connected to the external bus, issuing a request to the external CPU to obtain a bus ownership, and the like. Signal Control Out includes signals CSO0 and CSO1 serving as a chip select signal for the SRAM connected to the external bus, a signal WSOH serving as a write strobe signal for an upper byte, a signal RDY used in e.g., accessing a memory of a slow access rate, notifying that data has been completely transferred, and a signal BUSR serving as a bus ownership request signal.

A signal Control In is a control signal received for example from the external CPU connected to the external bus. Signal Control In includes signals CSI0 and CSI1 serving as a chip select signal for the SRAM output from the external CPU, and a signal BUSA serving as a bus ownership acknowledgement signal output from the external CPU.

A signal Control I/O is a control signal input and output in communicating data with the external CPU, SRAM and the like connected to the external bus. Signal Control I/O includes a signal WSI/WSOL serving as a write strobe signal input and output in writing data to the SRAM, and a signal RSI/RSO serving as a read strobe signal input and output in e.g., receiving data from the SRAM, outputting data from external-bus control block 61, and the like. A signal INTR is used to issue an interrupt request to the external CPU.

Integrated processor 1 and processor-bus control block 62 communicate therebetween the signals as described below: a signal PEBSINTX is used to issue a request to allow integrated processor 1 to start to access the SRAM or the like. A signal PERWINTX is a signal indicative of a read/write request issued from integrated processor 1 to processor-bus control block 62. A signal PEPRWADR is an address signal output when integrated processor 1 accesses data via processor-bus control block 62. A signal PEPWDATA is a data signal used when integrated processor 1 writes data via processor-bus control block 62. A signal HIDCINTX is a signal indicating that the integrated processor has completed access to the SRAM or the like. A signal HIPRDATA is a data signal used when integrated processor 1 reads data via processor-bus control block 62.

Figure 3:
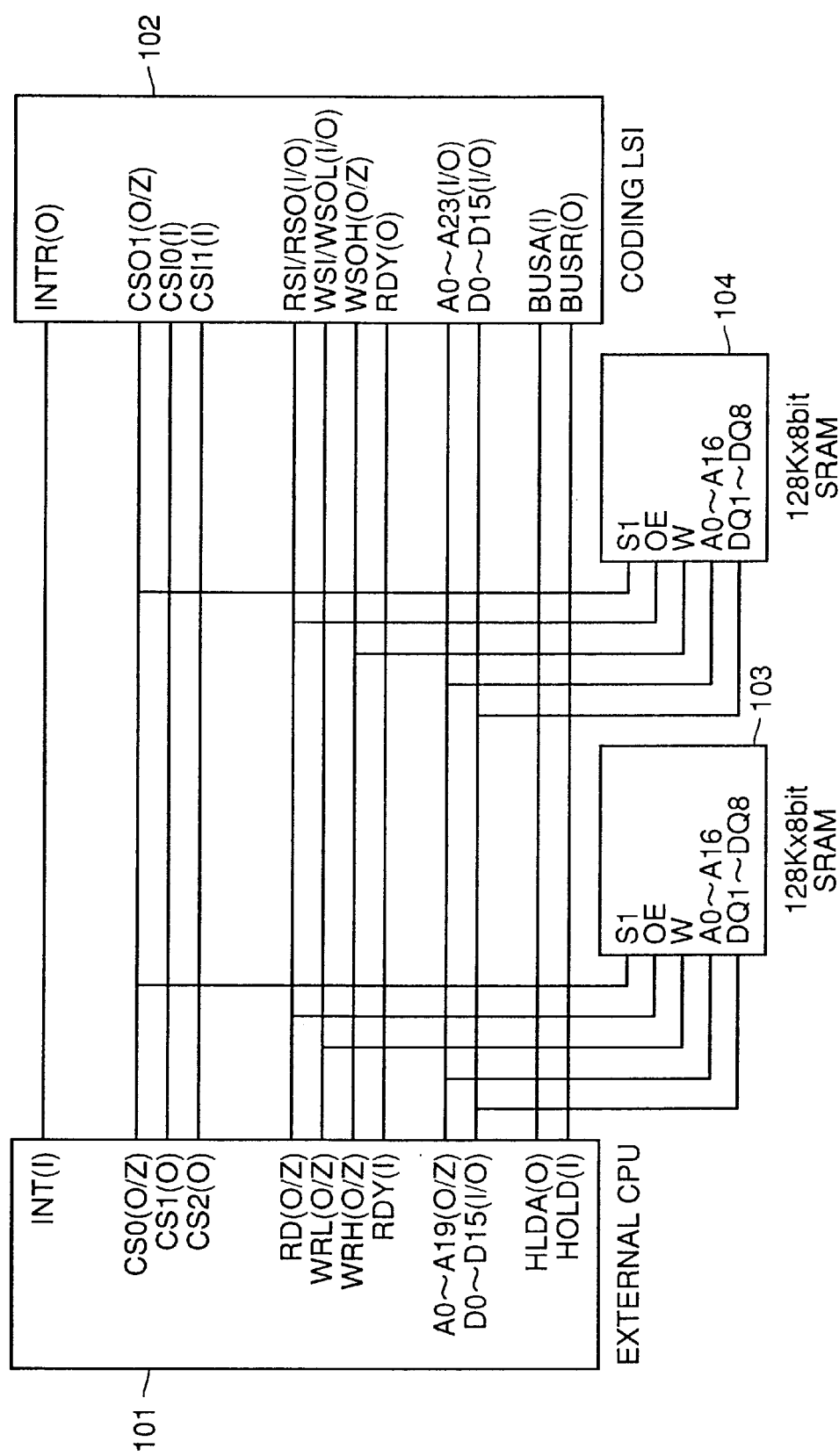
FIG. 3 shows a connection between an external CPU and the coding device according to the first embodiment of the present invention.

FIG. 3 shows a connection between the coding device and the external CPU in the present embodiment. An external CPU 101 is connected to each signal of external-bus control block 61 shown in FIG. 2. External-bus control block 61 has signals CSO1, RSI/RSO, WSI/WSOL, WSOH, A0–A23 (Address Out, Address In) and D0–D15 (Data In, Data Out) connected to SRAMs 103 and 104, allowing a coding device 102 to access SRAM 103 or 104.

Figure 4:
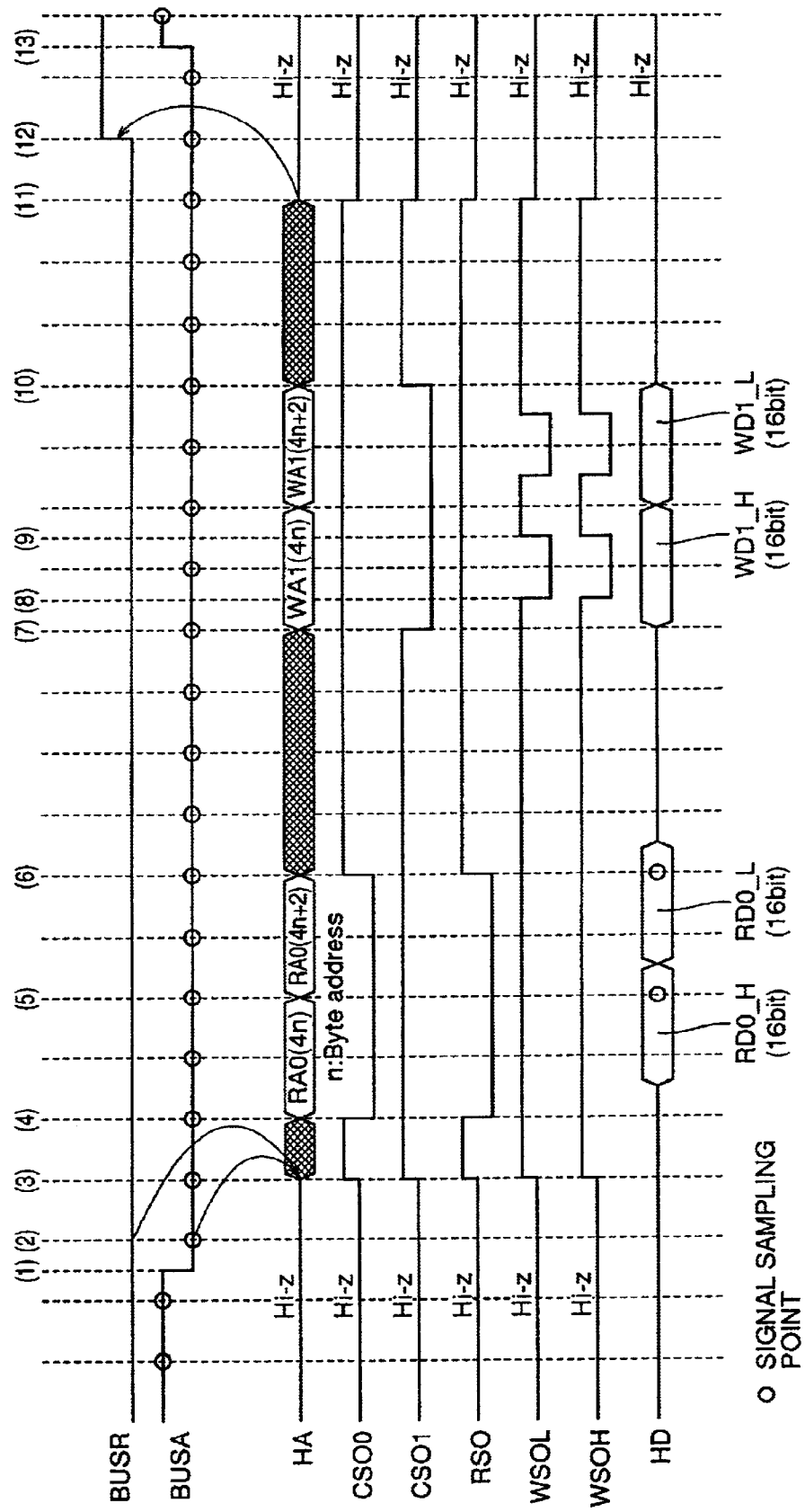
FIG. 4 is timing plots when a bus ownership is transferred.

FIG. 4 is timing plots when a bus ownership is transferred. External CPU 101 and coding device 102 share SRAMs 103 and 104, and either external CPU 101 or coding device 102 acts as a bus master and thus obtain the ownership of a bus to SRAMs 103 and 104. In the normal state, external CPU 101 is the bus master. In order for coding device 102 to obtain the bus ownership, coding device 102 asserts signal BUSR to external CPU 101. Then signals on the external bus are timed as described in detail below:

Coding device 102 sets signal BUSR to "0" to obtain a bus ownership. Processor-bus control block 62 determines whether an address signal (PEPRWADR) output from integrated processor 1 accesses an external device such as SRAMs 103 and 104 or it accesses an internal of coding device 102. If processor-bus control block 62 determines that the address signal accesses an external device, processor-bus control block 62 notifies external-bus control block 61 accordingly. Receiving such notification, external-bus control block 61 asserts signal BUSR.

External CPU 101 detects signal BUSR, and when external CPU 101 is ready for transferring its bus ownership, external CPU 101 sets signal BUSA to "0" at the timing as represented in FIG. 4 at (1). Coding device 102 detects the assertion of signal BUSA at the timing as represented in FIG. 4 at (2) and acknowledges that it has obtained the bus ownership. Then, at the timing as represented in FIG. 4 at (3), coding device 102 starts to provide outputs on signals HA (A0–A23), CSO0, CSO1, RSO, WSOL, WSOH and HD (D0–D15), or cancels a high-impedance state.

Coding device 102 outputs "RA0 (4n)" on signal HA and activates signals CSO0 and RSO or sets them to "0" at the timing as represented in FIG. 4 at (4). Responsively, SRAMs 103 and 104 outputs "RD0_H" on signal HD. Furthermore, at the timing as represented in FIG. 4 at (5), coding device 102 outputs "RA0 (4n+2)" on signal HA. Responsively, SRAMs 103 and 104 output "RD0_L" on signal HD. At the timing as represented in FIG. 4 at (6), coding device 102 inactivates signals CSO0 and RSO or sets them to "1" to complete reading data from SRAMs 103 and 104.

Furthermore, at the timing as represented in FIG. 4 at (7), coding device 102 outputs "WA1 (4n)" on signal HA, activates signal CSO1 or sets it to "0", and outputs "WD1_H" on signal HD. Then, at the timing as represented in FIG. 4 at (8), signals WSOL and WSOH are activated or set to "0". Then, at the timing as represented in FIG. 4 at (9), signals WSOL and WSOH are inactivated or set to "1" to write data "WD1_H" to SRAMs 103 and 104. Furthermore, at the timing as represented in FIG. 4 at (10), coding device 102 inactivates signal CSO1 or sets it to "1" to complete writing data.

When completing access to SRAMs 103 and 104, coding device 102 places signals HA (A0–A23) CSO0, CSO1, RSO, WSOL and WSOH in a high-impedance state at the timing as represented in FIG. 4 at (11) and negates signal BUSR at the timing as represented in FIG. 4 at (12). Detecting that signal BUSR has been negated, external CPU 101 negates signal BUSA to coding device 102 to regain the bus ownership.

To negate signal BUSR, integrated processor 1 writes in register block 63 at a predetermined register a content indicating that the bus ownership is no longer required. When such content has been written in register block 63 at the predetermined register, register block 63 notifies external-bus control block 61 accordingly. Receiving the notification, external-bus control block 61 negates signal BUSR.

Thus, in the coding device of the present embodiment, signal BUSR can be asserted when an integrated processor is detected having accessed an external device, and signal BUSR is negated when a content indicating that a bus ownership is no longer required can be detected having been written to a predetermined register. As such, even if the coding device accesses the external device successively, the bus ownership is only transferred once. As such, the coding device can process data with a reduced cycle and thus more efficiently.

Second Embodiment

The coding device of the present embodiment is distinguished from that of the first embodiment only in an internal configuration of register block 63. As such, like configurations and functions will not be described in detail. In the present embodiment, the register block is denoted by a reference numeral 63'.

FIGS. 5A and 5B are block diagrams showing an internal configuration of register block 63' according to the present embodiment. Register block 63' includes a status register 1 (65) allotted an interrupt factor for integrated processor 1, a status register 2 (66) allotted an interrupt factor for the external CPU, a mask register 1 (67) masking each bit of status register 1 (65), a mask register 2 (68) masking each bit of status register 2 (66), a plurality of AND circuits 69 respectively receiving corresponding bits of status register 1 (65) and that of mask register 1 (67), a plurality of AND circuits 70 respectively receiving corresponding bits of status register 2 (66) and that of mask register 2 (68), an OR circuit 71 receiving an output from the plurality of AND circuits 69 and an OR circuit 72 receiving an output from the plurality of AND circuits 70.

The interrupt factor may be status information for example on coding, such as completion of coding one sheet of image, the availability of a buffer, and the like, and it is allotted appropriately to status register 1 (65) or status register 2 (66). It may also be a write to a communication register accessible by either integrated processor 1 or external CPU 101. For example, external CPU 101 can be interrupted if status register 2 (66) is adapted to have a predetermined bit set to "1" when integrated processor 1 writes data to the communication register, and integrated processor 1 can be interrupted if status register 1 (65) is adapted to have a predetermined bit set to "1" when external CPU 101 writes data to the communication register.

Thus, in the coding device of the present embodiment, a status register serving as an interrupt factor for the integrated processor and a status register serving as an interrupt factor for the external CPU are provided separately. As such, integrated processor 1 is not interrupted due to the interrupt factor corresponding to external CPU 101. Thus the coding device can process data more efficiently.

Furthermore, an interrupt can occur when data is written in a register block at a communication register. Thus the coding device can readily detects that the external CPU writing data to the communication register and the coding device can process data more efficiently and more freely.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal processing device to be connected to an external processor through a bus, said external processor acting as a bus master to control a bus ownership between said integrated processor and external processor, comprising:

an integrated processor accessible to an external device connected to said bus; and an interface for providing said signal processing device with connection to at least said external processor and external device through said bus, wherein said interface includes:

a first detect portion detecting an access of said integrated processor to the external device;

a second detect portion detecting data contained in a predetermined register, said data written by said integrated processor upon gaining access to the external device; and a bus control portion asserting a bus request to said external processor in response to a result of detection provided by said first detect portion, and negating said bus request to said external processor in response to a result of detection provided by said second detect portion, in order for said integrated processor to obtain the bus ownership from or surrender it to said external processor.

2. The signal processing device according to claim 1, further comprising a video processing unit connected to said integrated processor via an internal bus to code a video signal.

3. The signal processing device according to claim 1, wherein said interface further includes:

a first status register allotted an interrupt factor for said integrated processor; and a second status register distinguished from said first status register and allotted an interrupt factor for said external processor.

4. The signal processing device according to claim 3, wherein said interface includes:

a communication register accessible from either one of said integrated processor and said external processor; and a portion setting a predetermined bit of said first status register when said external processor accesses said communication register.

5. The signal processing device according to claim 3, wherein said interface further includes:

a communication register accessible from either one of said integrated processor and said external processor; and a portion setting a predetermined bit of said second status register when said internal processor accesses said communication register.

6. The signal processing device according to claim 3, wherein said interface further includes:

a first mask register for masking each bit of said first status register; and a second mask register for masking each bit of said second status register.

7. The signal processing device according to claim 6, wherein said interface further includes:

a communication register accessible from either one of said integrated processor and said external processor; and a portion setting a predetermined bit of said first status register when said external processor accesses said communication register.

8. The signal processing device according to claim 6, wherein said interface further includes:

a communication register accessible from either one of said integrated processor and said external processor; and a portion setting a predetermined bit of said second status register when said internal processor accesses said communication register.

9. The signal processing device according to claim 3, further comprising a video processing unit connected to said integrated processor via an internal bus to code a video signal.

10. The signal processing device according to claim 9, wherein said interface includes:

a communication register accessible from either one of said integrated processor and said external processor; and a portion setting a predetermined bit of said first status register when said external processor accesses said communication register.

11. The signal processing device according to claim 9, wherein said interface further includes:

a communication register accessible from either one of said integrated processor and said external processor; and a portion setting a predetermined bit of said second status register when said internal processor accesses said communication register.

12. The signal processing device according to claim 9, wherein said interface further includes:

a first mask register for masking each bit of said first status register; and a second mask register for masking each bit of said second status register.

13. The signal processing device according to claim 12, wherein said interface further includes:

a communication register accessible from either one of said integrated processor and said external processor; and a portion setting a predetermined bit of said first status register when said external processor accesses said communication register.

14. The signal processing device according to claim 12, wherein said interface further includes:

a communication register accessible from either one of said integrated processor and said external processor; and a portion setting a predetermined bit of said second status register when said internal processor accesses said communication register.

* * * * *